US012712184B2

(12) United States Patent
Park et al.

(10) Patent No.: US 12,712,184 B2
(45) Date of Patent: Aug. 18, 2026

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Jung Bae Park, Cheongju-si (KR); Moon Ho Choi, Cheongju-si (KR); Young Nam Park, Cheongju-si (KR); Chang Woo Lee, Cheongju-si (KR); Chae Won Moon, Cheongju-si (KR); Tae Ho Park, Cheongju-si (KR); JunYeub Yang, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 742 days.

(21) Appl. No.: 18/190,679

(22) Filed: Mar. 27, 2023

(65) Prior Publication Data

US 2023/0238530 A1 Jul. 27, 2023

Related U.S. Application Data

(63) Continuation of application No. PCT/KR2021/016127, filed on Nov. 8, 2021.

(30) Foreign Application Priority Data

Dec. 30, 2020 (KR) ........................ 10-2020-0187479
Oct. 21, 2021 (KR) ........................ 10-2021-0140793

(51) Int. Cl.
*H01M 4/525* (2010.01)
*H01M 4/02* (2006.01)
*H01M 10/052* (2010.01)

(52) U.S. Cl.
CPC ......... *H01M 4/525* (2013.01); *H01M 10/052* (2013.01); *H01M 2004/021* (2013.01); *H01M 2004/028* (2013.01)

(58) Field of Classification Search
CPC ............... H01M 4/525; H01M 10/052; H01M 2004/021; H01M 2004/028
USPC .................................................... 429/231.95
See application file for complete search history.

(56) References Cited

U.S. PATENT DOCUMENTS 10,490,809 B2 11/2019 Noh et al.
2013/0230775 A1 9/2013 Endo
2018/0013129 A1* 1/2018 Lee ......................... H01M 4/36
2020/0373554 A1 11/2020 Amine et al.
2022/0407064 A1* 12/2022 Seo ....................... H01M 4/505

FOREIGN PATENT DOCUMENTS

JP 2018-534735 A 11/2018
KR 10-2016-0149162 A 12/2016
KR 10-2017-0075915 A 7/2017
KR 10-2018-0133141 A 12/2018
KR 10-2020-0018852 A 2/2020
KR 10-2020-0099424 A 8/2020
KR 10-2144057 B1 8/2020
KR 10-2178781 B1 11/2020

OTHER PUBLICATIONS

International Search Report issued in PCT/KR2021/016127; mailed Feb. 22, 2022.

* cited by examiner

*Primary Examiner* — Allison Bourke
*Assistant Examiner* — Robert Gene West
(74) *Attorney, Agent, or Firm* — Studebaker Brackett PLLC

(57) ABSTRACT

The present invention relates to a positive electrode active material and a lithium secondary battery using the same, and more particularly, to a positive electrode active material that includes a lithium composite oxide comprising at least nickel and cobalt, and is capable of improving particle stability not only on the surface portion but also at the central portion of the lithium composite oxide due to the formation of a concentration gradient in which a cobalt concentration decreases from the surface portion to the central portion of the lithium composite oxide relative to the average radius of the lithium composite oxide to a predetermined thickness, a positive electrode comprising the positive electrode active material, and the lithium secondary battery using the positive electrode.

11 Claims, No Drawings

POSITIVE ELECTRODE ACTIVE MATERIAL AND LITHIUM SECONDARY BATTERY COMPRISING THE SAME

CROSS-REFERENCE TO RELATED APPLICATION

This application is based on the PCT Application No. PCT/KR2021/016127, filed on Nov. 8, 2021, and claims the benefit of priority from the prior Korean Patent Application No. 10-2020-0187479, filed on Dec. 30, 2020, and Korean Patent Application No. 10-2021-0140793, filed on Oct. 21, 2021, the disclosures of which are incorporated herein by reference in its entirety.

TECHNICAL FIELD

The present invention relates to a positive electrode active material and a lithium secondary battery using the same, and more particularly, to a positive electrode active material that includes a lithium composite oxide comprising at least nickel and cobalt, and is capable of improving particle stability not only on the surface portion but also at the central portion of the lithium composite oxide due to the formation of a concentration gradient in which a cobalt concentration decreases from the surface portion to the central portion of the lithium composite oxide relative to the average radius of the lithium composite oxide to a predetermined thickness, a positive electrode comprising the positive electrode active material, and the lithium secondary battery using the positive electrode.

BACKGROUND ART

Batteries store electrical power by using materials facilitating an electrochemical reaction at a positive electrode and a negative electrode. As a representative example of such batteries, there is a lithium secondary battery storing electrical energy by means of a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging a liquid organic electrolyte or a polymer electrolyte between the positive electrode and the negative electrode.

As a positive electrode active material of the lithium secondary battery, a lithium composite oxide may be used, and for example, composite oxides such as $LiCoO_2$, $LiMn_2O_4$, $LiNiO_2$, $LiMnO_2$ are being studied.

Among the positive electrode active materials, $LiCoO_2$ is most widely used due to excellent lifetime characteristics and charge/discharge efficiency, but it is expensive due to cobalt being a limited resource, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated. Since most of the Li by-products consist of LiOH and $Li_2CO_3$, they may cause gelation in preparation of a positive electrode paste or cause gas generation according to repeated charge/discharge after the manufacture of an electrode. Residual $Li_2CO_3$ not only increases cell swelling to reduce the number of cycles, but also causes the swelling of a battery.

Meanwhile, a lithium composite oxide included in a positive electrode active material is accompanied by a volume change according to the intercalation/deintercalation of lithium ions for the lithium composite oxide during charging/discharging. Usually, a lithium composite oxide is in the form of a secondary particle in which a plurality of unit particles (primary particles) are aggregated, and when an abrupt volume change of primary particles during charging/discharging, or stress caused by repeated charging/discharging is accumulated, there is a problem in that cracks occur in the primary particles and/or secondary particles, or the collapse or change (phase transition) of the crystal structures thereof occurs.

Since this problem eventually acts as a cause of degrading the stability and reliability of a positive electrode active material, various studies have been conducted to mitigate the volume change of a lithium composite oxide during charging/discharging, or prevent the damage to particles by minimizing the generation of stress due to the volume change.

DISCLOSURE

Technical Problem

In the lithium secondary battery market, the growth of lithium secondary batteries for electric vehicles is driving the market, and accordingly, the demand for positive electrode materials used in lithium secondary batteries is also continuously increasing.

For example, conventionally, to ensure stability, lithium secondary batteries using LFP have mainly been used, but recently, the use of a nickel-based lithium composite oxide having a larger energy capacity per weight than LFP tends to be increasing.

Accordingly, positive electrode active materials used in lithium secondary batteries with higher specifications need to satisfy both appropriately expected stability and reliability even under harsher operating conditions.

Conventionally, stress caused by the volume change of a primary particle has been dispersed due to a predetermined void between adjacent primary particles to mitigate the volume change of a lithium composite oxide during charging/discharging, or to prevent the damage to particles by minimizing the generation of stress due to the volume change. However, such a lithium composite oxide has a limitation that the energy density per unit volume is low.

In addition, since the deterioration of a lithium composite oxide usually occurs on the surface of a particle or at the interface between particles, a volume change of the lithium composite oxide during charging/discharging may be mitigated or stress generation caused by the volume change may be reduced by coating the surface and/or interface of particles. Generally, a lithium composite oxide is in the form of a secondary particle formed by aggregation of a large amount of primary particles, and here, the content of raw materials required for sufficient coating of the surface and/or interface of primary particles is bound to increase as well. In this case, as the content of coating elements in the final product increases and a nickel content decreases accordingly, there is a risk of lowering the charge/discharge capacity of a positive electrode active material.

Therefore, the present invention is directed to providing a positive electrode active material with a low degree of particle aggregation in order to exhibit a sufficient particle protective effect not only on the surface portion but also at the central portion of a lithium composite oxide even when a relatively small amount of raw material for coating is used.

In addition, the present invention is directed to providing a positive electrode active material which is capable of improving particle stability not only on the surface portion but also at the central portion of the lithium composite oxide due to the formation of a concentration gradient in which a cobalt concentration, based on the cross-section of the lithium composite oxide, decreases from the surface portion to the central portion of the lithium composite oxide relative to the average radius of the lithium composite oxide to a predetermined thickness.

In addition, the present invention is directed to providing a positive electrode including the positive electrode active material defined herein.

Moreover, the present invention is directed to providing a lithium secondary battery using the positive electrode defined herein.

Technical Solution

One aspect of the present invention provides a positive electrode active material that includes a lithium composite oxide comprising at least nickel and cobalt, and improves particle stability not only on the surface portion but also at the central portion of the lithium composite oxide due to the formation of a concentration gradient in which a cobalt concentration, based on the cross-section of the lithium composite oxide, decreases from the surface portion to the central portion of the lithium composite oxide relative to the average radius of the lithium composite oxide to a predetermined thickness.

Specifically, based on the cross-section of the lithium composite oxide in the positive electrode active material, the lithium composite oxide may be divided into a first section in which a decreasing gradient of cobalt concentration is formed from the surface portion to the central portion of the lithium composite oxide, and a second section in which the cobalt concentration is maintained within a predetermined range inside the first section.

Here, when the average radius measured from the cross-section of the lithium composite oxide is denoted by d, by having a ratio (d1/d) of the thickness (d1) of the first section to the average radius (d) being present in the range of 0.08 to 0.27, a sufficient particle protective effect in the surface and central portions of the lithium composite oxide may be exhibited while minimizing the content of a raw material for coating used for the surface and/or interface coating of the lithium composite oxide.

In one embodiment, in a cross-sectional SEM image obtained by photographing the cross-section of the lithium composite oxide using a scanning electron microscope (SEM) after cross-sectioning the lithium composite oxide, a grain boundary density calculated by Equation 1 below for crystallites lying on an imaginary straight line crossing the center of the lithium composite oxide in the minor axis direction may be 0.50 or less.

Grain boundary density=(Number of grain boundaries between crystallites lying on the imaginary straight line/Number of crystallites lying on the imaginary straight line) [Equation 1]

Here, the lithium composite oxide may be a non-aggregated single particle consisting of a single crystallite, and in this case, the grain boundary density calculated from the lithium composite oxide according to Equation 1 may be 0.

When the lithium composite oxide is a non-aggregated single particle formed of a single crystallite, based on the cross-section of the single particle, it may be divided into a first section in which a concentration gradient in which the concentration of cobalt decreases from the surface portion to the central portion of the single particle is formed and a second section in which the cobalt concentration is maintained in a predetermined range inside the first section.

In addition, the positive electrode active material may be an aggregate of a plurality of lithium composite oxides. That is, the positive electrode active material may be provided as an aggregate of a plurality of lithium composite oxides with the same or different grain boundary densities, calculated by Equation 1.

In this case, in a cross-sectional SEM image obtained by photographing the cross-section of the lithium composite oxide using a scanning electron microscope (SEM) after cross-sectioning the lithium composite oxide of the positive electrode active material, the proportion of the lithium composite oxide with a grain boundary density of 0.50 or less calculated by Equation 1 for crystallites lying on the imaginary straight line crossing the center of the lithium composite oxide in the minor axis direction is preferably 30% or more.

In another embodiment, to increase the particle stability on the surface of the lithium composite oxide, a coating layer that covers at least a part of the surface of the lithium composite oxide may be prepared.

In addition, another aspect of the present invention provides a positive electrode including the positive electrode active material defined herein.

Moreover, still another aspect of the present invention provides a lithium secondary battery using the positive electrode defined herein.

Advantageous Effects

As described above, a lithium composite oxide included in a positive electrode active material inevitably undergoes a volume change according to the intercalation/deintercalation of lithium ions for the lithium composite oxide during charging/discharging. Here, while there may be various methods for mitigating the volume change of a lithium composite oxide during charging/discharging, or preventing the damage to particles by minimizing the generation of stress due to the volume change, it is difficult to say that the problem of the deterioration of lithium secondary batteries due to the damage to a lithium composite oxide included in the positive electrode active material has been sufficiently resolved.

However, according to the present invention, a positive electrode active material includes a lithium composite oxide comprising at least nickel and cobalt, and is capable of improving particle stability not only on the surface, but also at the center of the lithium composite oxide as a concentration gradient in which a cobalt concentration, based on the cross-section of the lithium composite oxide, decreases from the surface portion to the central portion of the lithium composite oxide relative to the average radius of the lithium composite oxide is formed to a predetermined thickness.

Accordingly, when the positive electrode active material according to the present invention is used, it is possible to delay the performance deterioration of a lithium secondary battery based on the positive electrode active material.

MODES OF THE INVENTION

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material according to the present invention and a lithium secondary battery including the positive electrode active material will be described in further detail.

Positive Electrode Active Material

According to one aspect of the present invention, a positive electrode active material including a lithium composite oxide comprising at least nickel and cobalt is provided. In addition, the lithium composite oxide is a composite metal oxide that includes nickel, cobalt and lithium, and has a layered crystal structure capable of intercalation/deintercalation of lithium ions.

In the lithium composite oxide, cobalt may have a concentration gradient that decreases from the surface portion to the central portion of the lithium composite oxide. In the lithium composite oxide, the concentration of a transition metal may be measured by various known methods. For example, after cross-sectioning the lithium composite oxide, a change in concentration of a target transition metal may be measured by a line scanning method through EDS mapping. That is, the concentration change of the target transition metal may be confirmed in a direction from the surface portion to the central portion of the lithium composite oxide.

In addition, there is an Energy Profiling-Energy Dispersive X-ray Spectroscopy (EP-EDS) method of measuring the concentration of a target transition metal at a specific depth to which electron beam penetrates for each acceleration voltage while changing the acceleration voltage ($V_{acc}$) of the electron beam applied to the surface of the lithium composite oxide.

Here, the concentration gradient of cobalt may be a concentration gradient in which the cobalt concentration continuously or discontinuously decreases from the surface portion to the central portion of the lithium composite oxide.

That is, when the cobalt concentration decreases from the starting point to the end point in an arbitrary section where the cobalt concentration is measured, the cobalt may be referred to as one that has a concentration gradient decreasing from the starting point to the end point in the arbitrary section.

A region in which a concentration gradient of cobalt, which decreases from the surface portion to the central portion of the lithium composite oxide based on the cross-section of the lithium composite oxide, is formed may be defined as a first section. Here, the surface portion of the lithium composite oxide, which is the starting point of the first section corresponds to the outermost part of the lithium composite oxide. In addition, the end point of the first section is the same as the starting point of the second section, which will be described below.

Inside the first section, there is a region in which a cobalt concentration in the lithium composite oxide is maintained within a predetermined range, and the region may be defined as a second section.

When compared with the slope of the change in cobalt concentration between the starting point and end point of the first section, the change in concentration of cobalt in the second section is insignificant, and a region with a lower slope than that of the change in concentration of cobalt between the starting point and end point of the first section may be defined as the second section.

In addition, a region in which the change rate of the cobalt concentration in the lithium composite oxide is 10 mol % or less may be defined as a second section, and here, the change rate of the cobalt concentration may refer to a change rate estimated by comparing the concentrations of cobalt at the starting and end points in any region, or the difference between the average concentration of cobalt in the second section and a cobalt concentration at any point in the second section.

In summary, the lithium composite oxide included in the positive electrode active material according to the present invention is divided into a first section in which a concentration gradient in which a cobalt concentration decreases from the surface portion to the central portion of the lithium composite oxide is formed based on the cross-section of the lithium composite oxide, and a second section in which the cobalt concentration is maintained within a predetermined range inside the first section.

Here, when the average radius measured from the cross-section of the lithium composite oxide is denoted by d, a ratio (d1/d) of the thickness (d1) of the first section to the average radius (d) is 0.08 to 0.27, and a ratio (d2/d) of the thickness (d2) of the second section to the average radius (d) is preferably 0.73 to 0.92.

When a ratio (d1/d) of the thickness (d1) of the first section to the average radius (d) is smaller than 0.08, as cobalt in the lithium composite oxide is present excessively close to the outermost part of the lithium composite oxide, it may be difficult to sufficiently prevent particle damage such as the generation of cracks, or collapse or change (phase transition) of the crystal structure in the lithium composite oxide.

On the other hand, when a ratio (d1/d) of the thickness (d1) of the first section to the average radius (d) is larger than 0.27, as a cobalt content in the central portion of the lithium composite oxide is excessively increased and a nickel content decreases accordingly, the charge/discharge capacity of a lithium secondary battery using the lithium composite oxide may be lower.

The average molar ratio of Co/Ni in the first section is preferably 0.25 to 0.39, and a ratio of the average Co concentration (c1) in the first section and the average Co concentration (c) measured based on ICP analysis for the lithium composite oxide is preferably 1.70 to 2.60.

That the molar ratio of Co/Ni in the first section is smaller than 0.25, or the ratio of the average Co concentration (c1) in the first section and the average Co concentration (c) measured based on ICP analysis for the lithium composite oxide is smaller than 1.70 means that not only is there sufficient cobalt in the first section, but the cobalt content in the second section, which is lower than that in the first section, is also excessively small.

In this case, it may be difficult to sufficiently prevent the damage (e.g., collapse or change (phase transition) of the crystal structure) to particles present in the surface and central portions of the lithium composite oxide.

In other words, when the lithium composite oxide is a secondary particle in which a plurality of primary particles are aggregated, due to the insufficient protective effect on the surfaces of the primary particles located in a surface portion of the secondary particle (or the surface of a primary particle that is disposed in the surface portion of the secondary particle and exposed to external air) and a central portion of the secondary particles, damage (e.g., the collapse and change (phase transition) of a crystal structure) to the primary particles located in the surface and central portions of the secondary particle may occur.

On the other hand, that the average molar ratio of Co/Ni in the first section is larger than 0.39, or the ratio of the average Co concentration (c1) in the first section and the average Co concentration (c) measured based on ICP analysis for the lithium composite oxide is larger than 2.60 means that as cobalt is excessively concentrated in the first section, the cobalt content in the second section is insufficient, or cobalt in the first section is present in an excessive state in the first section.

In this case, as cobalt is excessively concentrated in the first section, rather, an adverse effect of lowering the charge/discharge capacity of a lithium secondary battery using the lithium composite oxide occurs, or as the content of cobalt in the second section is insufficient, it may be difficult to sufficiently prevent particle damage such as the collapse or change (phase transition) of the crystal structure in the central portion (the region corresponding to the second section) of the lithium secondary oxide.

In addition, the average molar ratio of Co/Ni in the second section may be changed depending on the composition of a targeted lithium composite oxide, but it is preferably smaller than 0.090 to improve the charge/discharge capacity of a lithium secondary battery using the lithium composite oxide. When the average molar ratio of Co/Ni in the second section is 0.089, the average molar ratio of Co/Ni at the end point of the first section may be 0.089 or more.

As the molar ratio of Co/Ni in the second section increases, the charge/discharge capacity of a lithium secondary particle using the lithium composite oxide may be lowered.

In addition, as the molar ratio of Co/Ni in the second section increases, it may mean that the content of cobalt in the first section is relatively insufficient under the premise that the same amount of cobalt-comprising raw material was used to prepare the lithium composite oxide. In this case, the particle protective effect on the surface portion of the lithium composite oxide may be insufficient.

In one embodiment, the lithium composite oxide may be represented by Formula 1 below.

$$Li_wNi_{1-(x+y+z)}Co_xM1_yM2_zO_2 \quad \text{[Formula 1]}$$

Wherein,

M1 is at least one selected from Mn and Al,

M2 is at least one selected from P, Sr, Ba, Ti, Zr, Mn, Al, W, Ce, Hf, Ta, Cr, F, Mg, V, Fe, Zn, Si, Y, Ga, Sn, Mo, Ge, Nd, B, Nb, Gd and Cu, M1 and M2 are different, $0.5 \le w \le 1.5$, $0 \le x \le 0.50$, $0 \le y \le 0.20$, and $0 \le z \le 0.20$.

In the lithium composite oxide represented by Formula 1, x corresponding to the cobalt concentration in the first section and x corresponding to the cobalt concentration in the second section may have different values. In addition, as the cobalt concentrations in the first and second sections are different, the concentration of at least one metal element selected from nickel, M1 and M2 may also be different.

The lithium composite oxide may be expressed as an average composition measured by ICP analysis even when the concentrations of at least one metal element including cobalt are different in the first and second sections.

The lithium composite oxide may be a high-Ni lithium composite oxide in which the concentrations (mol %) of Ni, Co, M1 and M2 in Formula 1 satisfy Relationship 1 below.

$$Ni/(Ni+Co+M1+M2) \ge 80.0 \quad \text{[Relationship 1]}$$

In addition, the lithium composite oxide may be a high-Ni/low-Co lithium composite oxide in which the concentrations (mol %) of Ni, Co, M1 and M2 in Formula 1 satisfy Relationship 1 and the Co content may be 10 mol % or less, and preferably 5 mol % or less.

That is, in the lithium composite oxide, the concentrations (mol %) of Ni, Co, M1 and M2 in Formula 1 satisfy Relationship 2 below.

$$Co/(Ni+Co+M1+M2) \le 5.0 \quad \text{[Relationship 2]}$$

Generally, in a lithium composite oxide including at least nickel and cobalt, as the Ni content increases, it is known that the structural instability of the lithium composite oxide may be caused by Li/Ni cation mixing. In addition, in the lithium composite oxide including at least nickel and cobalt, as the cobalt content decreases, the initial overvoltage (resistance) increases, and therefore, it is known that a decrease in rate capability is inevitable.

However, as a concentration gradient in which the concentration of cobalt decreases from the surface portion to the central portion of the lithium composite oxide is formed to a predetermined thickness, relative to the average radius thereof, the lithium composite oxide included in the positive electrode active material according to one embodiment of the present invention may mitigate and/or prevent the structural instability and rate capability deterioration of a high-Ni or high-Ni/low-Co lithium composite oxide.

Meanwhile, the lithium composite oxide included in the positive electrode active material defined herein may be a secondary particle including at least one primary particle. Here, the primary particle may be expressed as a crystallite.

Here, the "secondary particle including at least one primary particle" should be interpreted to include a "particle formed by aggregating a plurality of primary particles" or a "non-aggregated single particle consisting of a single crystallite."

The primary particle and the secondary particle may each independently have a rod shape, an oval shape and/or an irregular shape.

When an average major axis length is used as an indicator showing the sizes of the primary particle and the secondary particle, the average major axis length of the primary particles constituting the lithium composite oxide may be 0.1 to 5 μm, and the average major axis length of the secondary particles may be 1 to 30 μm. The average major axis length of the secondary particles may vary depending on the number of primary particles constituting the secondary particle, and the positive electrode active material may include particles with various average major axis lengths.

When the lithium composite oxide is a "non-aggregated single particle consisting of a single crystallite," or a "particle formed by aggregating a relatively small number of primary particles," the size (average particle diameter) of a primary particle included in the "non-aggregated single particle consisting of a single crystallite," or a "particle formed by aggregating a relatively small number of primary particles" may be larger than that in a "secondary particle formed by aggregating tens to hundreds or more of primary particles."

Likewise, the lithium composite oxide, which is a "non-aggregated single particle consisting of a single crystallite," or a "particle formed by aggregating a relatively small number of primary particles," requires harsh thermal treatment conditions (high thermal treatment temperature/long-term thermal treatment) compared with when a "secondary particle formed by aggregating tens to hundreds or more of primary particles" is generally prepared. It is known that, according to the long-term thermal treatment at a relatively high temperature (e.g., 800° C. or more), particle growth (grain growth) is promoted to obtain a positive electrode active material in which the size of a single particle increases and the degree of particle aggregation is lowered.

For example, when the lithium composite oxide is a "non-aggregated single particle consisting of a single crystallite," or a "particle formed by aggregating a relatively small number of primary particles," the average major axis length of the primary particles may be in the range of 0.5 to 20 μm. On the other hand, when the lithium composite oxide is a "particle formed by aggregating a plurality (tens to hundreds or more) of primary particles," the average major axis length of the primary particles may be in the range of 0.1 to 5 μm.

As described above, the positive electrode active material according to the present invention has a low degree of crystallite aggregation to exhibit a sufficient particle protective effect not only on the surface portion but also on the central portion of the lithium composite oxide even when using a relatively small amount of raw material for coating.

The degree of aggregation of the lithium composite oxide may be measured by the grain boundary density defined herein.

Specifically, the grain boundary density may be calculated by substituting the number of crystallites and the number of grain boundaries between crystallites lying on the imaginary straight line crossing the center of the lithium composite oxide in a minor axis direction in a cross-sectional SEM image obtained by photographing the cross-section of the lithium composite oxide using a scanning electron microscope (SEM) after cross-sectioning the lithium composite oxide into Equation 1 below.

Grain boundary density=(Number of grain boundaries between crystallites lying on the imaginary straight line/Number of crystallites lying on the imaginary straight line) [Equation 1]

Here, the lithium composite oxide may have a grain boundary density of 0.50 or less as calculated by Equation 1.

For example, when the lithium composite oxide is a non-aggregated single particle consisting of a single crystallite, there is one crystallite lying on the imaginary straight line crossing the center of the lithium composite oxide in the cross-sectional SEM image of the lithium composite oxide, and accordingly, since there is no interface between crystallites, the grain boundary density calculated according to Equation 1 is 0.

In addition, when the lithium composite oxide is a particle formed by aggregating a relatively small amount of primary particles, the number of crystallites (primary particles) lying on the imaginary straight line crossing the center of the lithium composite oxide in the cross-sectional SEM image of the lithium composite oxide is 2, and accordingly, since there is one interface between the crystallites, the grain boundary density calculated by Equation 1 is 0.5.

Generally, the lithium composite oxide is in the form of a secondary particle formed by aggregating a large number of primary particles, and here, in order to sufficiently coat the surface and/or interface between primary particles, the content of raw materials required for coating must also increase, and accordingly, there is a concern that the charge/discharge capacity or reversible efficiency of the positive electrode active material may be lowered due to the increased content of coating elements in the final product. In addition, under the premise of using the same amount of coating raw materials, as the number of primary particles in the secondary particle increases, the relative content of the coating raw material penetrating into the secondary particle increases, so the content of the coating elements present on the surface of the secondary particle may decrease.

Therefore, the lithium composite oxide according to the present invention satisfying the above-described definition of the grain boundary density has an advantage that a sufficient particle protective effect may be exhibited not only on the surface portion but also on the central portion of the lithium composite oxide even when using a relatively small amount of coating raw material is used.

Meanwhile, the positive electrode active material may be an aggregate of a plurality of lithium composite oxides. That is, the positive electrode active material may be provided as an aggregate of a plurality of lithium composite oxides with the same or different grain boundary densities, calculated by Equation 1.

Here, in a cross-sectional SEM image obtained by photographing the cross-section of the lithium composite oxide using a scanning electron microscope (SEM) after cross-sectioning the lithium composite oxide of the positive electrode active material, the proportion of a lithium composite oxide with a grain boundary density of 0.50 or less calculated by Equation 1 below for crystallites lying on the imaginary straight line crossing the center of the lithium composite oxide in the minor axis direction is preferably 30% or more.

The proportion of a lithium composite oxide with a grain boundary density of 0.50 or less calculated by Equation 1 in the positive electrode active material may be calculated by calculating each grain boundary density of a plurality of lithium composite oxides confirmed from the cross-sectional SEM image, and may then be calculated as a ratio of the number of lithium composite oxides with a grain boundary density of 0.50 or less with respect to the total number of lithium composite oxides confirmed from the cross-sectional SEM image.

That the proportion of the lithium composite oxide with a grain boundary density of 0.50 or less calculated by Equation 1 of the positive electrode active material is smaller than 30% means that a polycrystalline lithium composite oxide is present in an excessive amount in the positive electrode active material.

This means that it is necessary to introduce an excessively large amount of a cobalt-comprising raw material that has to be eventually used to achieve the thickness of a first section and the predetermined concentration of cobalt in the first section relative to the average radius of the lithium composite oxide defined herein. In this case, the average content of cobalt in the positive electrode active material provided as an aggregate of a plurality of lithium composite oxides increases, and accordingly, an Ni proportion decreases, so there is a concern that the charge/discharge capacity of the positive electrode active material may decrease. In addition, there is a problem that the manufacturing costs of the positive electrode active material increase due to the increased amount of cobalt-comprising raw material used to prepare the positive electrode active material.

In addition, a coating layer covering at least a part of the surface of the lithium composite oxide may be formed. At least one type of metal oxide represented by Formula 2 below is present in the coating layer. That is, the coating layer may be defined as a region in which an oxide represented by Formula 2 below is present on the surface of the lithium composite oxide.

$Li_aM3_bO_c$ [Formula 2]

Wherein,

M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \leq a \leq 10$, $0 \leq b \leq 8$, and $2 \leq c \leq 13$.

In addition, the coating layer may be a type in which different types of metal oxides are present in one layer at the same time, or in separate layers, respectively.

The metal oxide represented by Formula 2 may be physically and/or chemically bonded with the lithium composite oxide represented by Formula 1. In addition, the metal oxide may be present in a state of forming a solid solution with the primary particle represented by Formula 1.

When the lithium composite oxide is a non-aggregated single particle consisting of a single crystallite, the metal oxide may be partially or entirely present on the surface of the single particle.

On the other hand, when the lithium composite oxide is a secondary particle in which a plurality of primary particles are aggregated, the metal oxide may partially or entirely be present at the interface between the plurality of primary particles and on the surface of the secondary particle.

When the metal oxide is present on a part of the particle surface, the coating layer may be present in the form of an island.

Lithium Secondary Battery

According to another aspect of the present invention, a positive electrode including a positive electrode current collector and a positive electrode active material layer formed on the positive electrode current collector may be provided. Here, the positive electrode active material layer may include the above-described positive electrode active material prepared by a preparation method according to various embodiments of the present invention as a positive electrode active material. Accordingly, since the positive electrode active material is the same as described above, a detailed description will be omitted for convenience. Therefore, only the remaining components not described above will be described below.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may typically have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to manufacture a positive electrode.

In addition, in another exemplary embodiment, the positive electrode may be manufactured by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte wettability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric vehicle field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to still another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to exemplify the present invention, and thus the scope of the present invention will not be construed not to be limited by these examples.

Preparation Example 1. Preparation of Positive Electrode Active Material

Example 1

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03) and NaOH (Na/(Ni+Co+Al) mol ratio=0.01), the temperature of a furnace was raised to 820° C. at a rate of 2° C. per minute while maintaining an $O_2$ atmosphere, and first thermal treatment was then performed at 820° C. for 12 hours, thereby obtaining a lithium composite oxide.

(c) Based on the lithium composite oxide, an aqueous solution including 3.0 mol % of cobalt sulfate was prepared, and the lithium composite oxide, a complexing agent and a pH adjuster were added to the aqueous solution to prepare a mixture, followed by stirring for 1 hour. Subsequently, the mixture was dehydrated and then dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 8 hours, thereby obtaining a lithium composite oxide with a composition of $Li_{1.0}Ni_{0.876}Co_{0.109}Al_{0.011}Na_{0.00402}$. The composition of the lithium composite oxide was confirmed through ICP analysis.

Example 2

A positive electrode active material was prepared in the same manner as in Example 1, except that the temperature of first thermal treatment in (b) was 850° C.

Example 3

A positive electrode active material was prepared in the same manner as in Example 1, except that a lithium composite oxide obtained by mixing the oxide precursor with LiOH (Li/(Ni+Co+Al) mol ratio=1.03), NaOH (Na/(Ni+Co+Al) mol ratio=0.01) and KCl (K/(Ni+Co+Al) mol ratio=0.01) in (b), increasing the temperature of a furnace to 900° C. at a rate of 2° C. per minute while maintaining an $O_2$ atmosphere, and performing first thermal treatment at 900° C. for 12 hours was used.

The composition of the lithium composite oxide obtained in Example 3, confirmed through ICP analysis, was $Li_{1.0}Ni_{0.871}Co_{0.108}Al_{0.011}Na_{0.003}K_{0.007}O_2$.

Example 4

A positive electrode active material was prepared in the same manner as in Example 1, except that second thermal treatment was performed for 6 hours in (d).

Example 5

A positive electrode active material was prepared in the same manner as in Example 1, except that second thermal treatment was performed for 10 hours in (d).

Example 6

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03) and NaOH (Na/(Ni+Co+Al) mol ratio=0.01), the temperature of a furnace was raised to 820° C. at a rate of 2° C. per minute while maintaining an $O_2$ atmosphere, and first thermal treatment was then performed at 820° C. for 12 hours, thereby obtaining a lithium composite oxide.

(c) Based on the lithium composite oxide, an aqueous solution including 3.0 mol % of cobalt sulfate and 1.0 mol % of aluminum sulfate was prepared, and the lithium composite oxide, a complexing agent and a pH adjuster were added to the aqueous solution to prepare a mixture, followed by stirring for 1 hour. Subsequently, the mixture was dehydrated and then dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 8 hours, thereby obtaining a lithium composite oxide with a composition of $Li_{1.0}Ni_{0.865}Co_{0.108}Al_{0.023}Na_{0.00402}$. The composition of the lithium composite oxide was confirmed through ICP analysis.

Comparative Example 1

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03), the temperature of a furnace was raised to 720° C. at a rate of 2° C. per minute while maintaining an $O_2$ atmosphere, and first thermal treatment was then performed at 720° C. for 12 hours, thereby obtaining a lithium composite oxide.

(c) Based on the lithium composite oxide, an aqueous solution including 3.0 mol % of cobalt sulfate was prepared, and the lithium composite oxide, a complexing agent and a pH adjuster were added to the aqueous solution to prepare a mixture, followed by stirring for 1 hour. Subsequently, the mixture was dehydrated and then dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 8 hours, thereby obtaining a lithium composite oxide with a composition of $Li_{1.0}Ni_{0.879}Co_{0.109}Al_{0.012}O_2$. The composition of the lithium composite oxide was confirmed through ICP analysis.

Comparative Example 2

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03) and NaOH (Na/(Ni+Co+Al) mol ratio=0.01), the temperature of a furnace was raised to 820° C. at a rate of 2° C. per minute while maintaining an $O_2$ atmosphere, and first thermal treatment was then performed at 820° C. for 12 hours, thereby obtaining a lithium composite oxide.

(c) The lithium composite oxide was input into distilled water to prepare a mixture, followed by stirring for 1 hour. Subsequently, the mixture was dehydrated and dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 8 hours, thereby obtaining a lithium composite oxide with a composition of $Li_{1.0}Ni_{0.905}Co_{0.081}Al_{0.011}Na_{0.003}O_2$. The composition of the lithium composite oxide was confirmed through ICP analysis.

Comparative Example 3

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03), the temperature of a furnace was raised to 820° C. at a rate of 2° C. per minute while maintaining an $O_2$ atmosphere, and first thermal treatment was then performed at 820° C. for 12 hours, thereby obtaining a lithium composite oxide.

(c) Based on the lithium composite oxide, an aqueous solution including 3.0 mol % of cobalt sulfate was prepared, and the lithium composite oxide, a complexing agent and a pH adjuster were added to the aqueous solution to prepare a mixture, followed by stirring for 1 hour. Subsequently, the mixture was dehydrated and then dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 8 hours, thereby obtaining a lithium composite oxide with a composition of $Li_{1.0}Ni_{0.880}Co_{0.109}Al_{0.011}O_2$. The composition of the lithium composite oxide was confirmed through ICP analysis.

Comparative Example 4

(a) A $NiCoAl(OH)_2$ hydroxide precursor (Ni:Co:Al=91:8:1 (at %)) was synthesized by a known co-precipitation method using nickel sulfate, cobalt sulfate, and aluminum sulfate. The synthesized hydroxide precursor was oxidized by increasing the temperature at a rate of 10° C. per minute until 450° C. and performing a low temperature calcination at 450° C. for 6 hours.

(b) After mixing the oxide precursor with LiOH (Li/(Ni+Co+Al) mol ratio=1.03) and NaOH (Na/(Ni+Co+Al) mol ratio=0.01), the temperature of a furnace was raised to 820° C. at a rate of 2° C. per minute while maintaining an $O_2$ atmosphere, and first thermal treatment was then performed at 820° C. for 12 hours, thereby obtaining a lithium composite oxide.

(c) Based on the lithium composite oxide, an aqueous solution including 3.0 mol % of cobalt sulfate was prepared, and the lithium composite oxide, a complexing agent and a pH adjuster were added to the aqueous solution to prepare a mixture, followed by stirring for 1 hour. Subsequently, the mixture was dehydrated and then dried at 120° C. for 12 hours.

(d) The temperature of a furnace was raised to 700° C. at a rate of 2° C. per minute while maintaining an $O_2$ atmosphere, and the mixture was subjected to second thermal treatment at 700° C. for 18 hours, thereby obtaining a lithium composite oxide with a composition of $Li_{1.0}Ni_{0.874}Co_{0.1}\ Al_{0.011}Na_{0.004}O_2$. The composition of the lithium composite oxide was confirmed through ICP analysis.

Preparation Example 2. Manufacture of Lithium Secondary Battery

A positive electrode slurry was prepared by dispersing 92 wt % of each of the positive electrode active materials prepared according to Preparation Example 1, 4 wt % of artificial graphite and 4 wt % of a PVDF binder in 30 g of N-methyl-2-pyrrolidone (NMP). The positive electrode slurry was uniformly applied to an aluminum (Al) thin film having a thickness of 15 μm and dried under vacuum at 135° C., thereby manufacturing a positive electrode for a lithium secondary battery.

The positive electrode, lithium foil as a counter electrode, and a porous polyethylene film (Celgard 2300, thickness: 25 μm) as a separator, and an electrolyte prepared by adding $LiPF_6$ at 1.15M in a solvent in which ethylene carbonate and ethyl methyl carbonate were mixed in a volume ratio of 3:7 were used to manufacture a coin cell.

Experimental Example 1. Structural Analysis of Positive Electrode Active Material To measure the grain boundary density of each lithium composite oxide included in the positive electrode active materials prepared in Preparation Example 1, the degree of primary particle aggregation in a secondary particle was confirmed from the cross-sectional SEM image.

First, each lithium composite oxide included in the positive electrode active materials prepared in Preparation Example 1 was selected, and cross-sectioned using FIB (Ga-ion source), followed by photographing a cross-sectional SEM image using a scanning electron microscope.

Subsequently, for a plurality of particles confirmed from the cross-sectional SEM image, the number of crystallites lying on the imaginary straight line crossing the center of the particle in the minor axis direction and the number of grain boundaries between crystallites were substituted into Equation 1 below to calculate a grain boundary density.

Grain boundary density=(Number of grain boundaries between crystallites lying on the imaginary straight line/Number of crystallites lying on the imaginary straight line) [Equation 1]

In addition, among the plurality of particles confirmed from the cross-sectional SEM image, the proportion of particles with a grain boundary density of 0.5 or less calculated by Equation 1 was calculated, and the calculation result is shown in Table 1 below.

TABLE 1

| Classification | Grain boundary density (fraction %) | |
|---|---|---|
| | 0.5 or less | More than 0.5 |
| Example 1 | 45 | 55 |
| Example 2 | 56 | 44 |
| Example 3 | 72 | 28 |
| Example 4 | 45 | 55 |
| Example 5 | 45 | 55 |
| Example 6 | 45 | 55 |
| Comparative Example 1 | 0 | 100 |
| Comparative Example 2 | 45 | 55 |
| Comparative Example 3 | 45 | 55 |
| Comparative Example 4 | 45 | 55 |

Experimental Example 2. Compositional Analysis of Positive Electrode Active Material SEM/EDX analyses were performed to confirm the change in concentration of cobalt in the lithium composite oxides included in the positive electrode active materials prepared according to Preparation Example 1.

First, each lithium composite oxide included in the positive electrode active materials prepared according to Preparation Example 1 was selected, and then cross-sectioned using FIB (Ga-ion source), followed by photographing a cross-sectional SEM image using a scanning electron microscope.

Subsequently, after selecting 10 particles of the plurality of particles confirmed from the cross-sectional SEM image, cobalt, which is a target transition metal, was mapped through EDS analysis for the selected particles, and the change in cobalt concentration was confirmed to be in a direction from the surface portion to the central portion of the lithium composite oxide through line scanning.

Here, based on the cross-sectional SEM image of the lithium composite oxide, a region in which the concentration gradient in which the cobalt concentration decreases from the surface portion to the central portion of the lithium composite oxide is formed was defined as a first section, and a region in which the cobalt concentration is maintained in a predetermined range (change rate of cobalt concentration of 10 mol % or less) inside the first section was defined as a second section.

The analysis results are listed in Tables 2 and 3 below, the result values listed in Table 2 represent average values measured from a plurality of lithium composite oxides in each of the positive electrode active materials according to Examples and Comparative Examples.

TABLE 2

| Classification | d (μm) | d1 (μm) | d1/d |
|---|---|---|---|
| Example 1 | 2.80 | 0.23 | 0.08 |
| Example 2 | 2.14 | 0.25 | 0.12 |
| Example 3 | 1.67 | 0.35 | 0.21 |
| Example 4 | 2.65 | 0.24 | 0.09 |
| Example 5 | 2.79 | 0.32 | 0.11 |
| Example 6 | 1.95 | 0.21 | 0.11 |
| Comparative Example 1 | 7.20 | 0.06 | 0.01 |
| Comparative Example 2 | 6.94 | 0.00 | 0.00 |
| Comparative Example 3 | 3.13 | 0.11 | 0.03 |
| Comparative Example 4 | 2.77 | 0.77 | 0.28 |

TABLE 3

| Classification | c1 (mol %) | n1 (mol %) | c1/n1 | c1/c | c2 (mol %) | n2 (mol %) | c2/n2 |
|---|---|---|---|---|---|---|---|
| Example 1 | 0.246 | 0.754 | 0.326 | 2.253 | 0.080 | 0.920 | 0.087 |
| Example 2 | 0.240 | 0.760 | 0.316 | 2.202 | 0.079 | 0.921 | 0.086 |
| Example 3 | 0.226 | 0.774 | 0.292 | 2.093 | 0.077 | 0.923 | 0.084 |
| Example 4 | 0.249 | 0.751 | 0.332 | 2.284 | 0.080 | 0.920 | 0.087 |
| Example 5 | 0.234 | 0.766 | 0.305 | 2.147 | 0.079 | 0.921 | 0.086 |
| Example 6 | 0.242 | 0.758 | 0.319 | 2.241 | 0.080 | 0.920 | 0.087 |
| Comparative Example 1 | 0.303 | 0.697 | 0.434 | 2.778 | 0.082 | 0.918 | 0.090 |
| Comparative Example 2 | 0.000 | 1.000 | 0.000 | 0.000 | 0.083 | 0.917 | 0.091 |
| Comparative Example 3 | 0.284 | 0.716 | 0.397 | 2.606 | 0.082 | 0.918 | 0.089 |
| Comparative Example 4 | 0.187 | 0.813 | 0.230 | 1.685 | 0.080 | 0.920 | 0.087 |

d: Average radius of lithium composite oxide
d1: Thickness of first section confirmed from line sum spectrum graph
c1: Average concentration (mol %) of Co in first section
n1: Average concentration (mol %) of Ni in first section
c: Average Co concentration measured based on ICP analysis for lithium composite oxide
c2: Average concentration (mol %) of Co in second section
n2: Average concentration (mol %) of Ni in second section

Experimental Example 3. Evaluation of Electrochemical Properties of Lithium Secondary Battery Charging/discharging experiments were performed on each of the lithium secondary batteries (coin cells) manufactured in Preparation Example 2 using an electrochemical analyzer (Toyo, Toscat-3100) at 25° C. under conditions of a voltage range of 3.0V to 4.25V and a discharge rate of 0.2C to measure charge and discharge capacities.

In addition, the same lithium secondary battery was charged/discharged for 50 cycles at 25° C. in an operating voltage range of 3.0V to 4.25V under a condition of 1C/1C, and a rate of discharge capacity at the 50$^{th}$ cycle (capacity retention) relative to the initial capacity was then measured.

The measurement result is shown in Table 4 below.

TABLE 4

| Classification | Charge capacity (mAh/g) | Discharge capacity (mAh/g) | Charge/discharge efficiency (%) | Retention@50 cy (%) |
|---|---|---|---|---|
| Example 1 | 234.4 | 214.7 | 91.6% | 94.7% |
| Example 2 | 237.8 | 216.7 | 91.1% | 95.2% |
| Example 3 | 237.0 | 215.6 | 91.0% | 96.5% |
| Example 4 | 235.4 | 215.1 | 91.4% | 94.6% |
| Example 5 | 235.1 | 214.4 | 91.2% | 94.6% |
| Example 6 | 234.8 | 213.7 | 91.0% | 96.3% |
| Comparative Example 1 | 232.8 | 214.6 | 92.2% | 81.8% |
| Comparative Example 2 | 236.4 | 205.1 | 86.8% | 92.4% |
| Comparative Example 3 | 233.2 | 212.3 | 91.0% | 87.7% |
| Comparative Example 4 | 234.5 | 206.4 | 88.0% | 91.7% |

Experimental Example 4. Evaluation of Stability of Lithium Secondary Battery

A lithium secondary battery in the form of a 50 mm×65 mm pouch was manufactured in the same manner as in Preparation Example 2, charged to 4.3V with a constant current of 0.2C, and stored at a high temperature (70° C.) for 14 days, followed by measuring the change in volume of the lithium secondary batteries caused by gas generation therein. The volume change rates before/after high-temperature storage were converted into percentage after measuring volumes before/after high-temperature storage.

The volume change rates of the lithium secondary batteries measured according to the above-described method are shown in Table 5 below.

TABLE 5

| Classification | Volume change rate (%) |
|---|---|
| Example 1 | 10.5% |
| Example 2 | 9.2% |
| Example 3 | 7.0% |
| Example 4 | 11.3% |
| Example 5 | 10.9% |
| Example 6 | 8.5% |
| Comparative Example 1 | 28.8% |
| Comparative Example 2 | 20.6% |
| Comparative Example 3 | 17.5% |
| Comparative Example 4 | 14.9% |

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

The invention claimed is:

1. A positive electrode active material comprising a lithium composite oxide particle comprising at least nickel and cobalt, wherein, based on a cross-section of the lithium composite oxide particle, the lithium composite oxide particle comprises:

a first section, in which cobalt concentration decreases from a surface portion towards a central portion of the lithium composite oxide particle, and a second section located inward of the first section in the direction toward the central portion of the lithium composite oxide particle, in which cobalt concentration is maintained within a predetermined range wherein d1/d is 0.08 to 0.27, where d1 is a thickness of the first section and d is an average radius of the lithium composite oxide particle, and wherein a ratio of an average Co concentration (c1) in the first section and an average Co concentration (c) measured based on ICP analysis for the lithium composite oxide particle is 1.70 to 2.60.

2. The positive electrode active material of claim 1, wherein an average molar ratio of Co/Ni in the first section is 0.25 to 0.39.

3. The positive electrode active material of claim 1, wherein d2/d is more than 0.73 and less than 0.92, where d2 is a thickness of the second section.

4. The positive electrode active material of claim 1, wherein a change rate of the cobalt concentration in the second section is 10 mol % or less.

5. The positive electrode active material of claim 1, wherein the lithium composite oxide particle is represented by Formula 1 below, $$Li_wNi_{1-(x+y+z)}Co_xM1_yM2_zO_2 \quad \text{[Formula 1]}$$

Wherein,

M1 is at least one selected from Mn and Al,

M2 is at least one selected from P, Sr, Ba, Ti, Zr, Mn, Al, W, Ce, Hf, Ta, Cr, F, Mg, V, Fe, Zn, Si, Y, Ga, Sn, Mo, Ge, Nd, B, Nb, Gd and Cu, M1 and M2 are different, $0.5 \le w \le 1.5$, $0 \le x \le 0.50$, $0 \le y \le 0.20$, and $0 \le z \le 0.20$.

6. The positive electrode active material of claim 1, wherein in a cross-sectional SEM image obtained by photographing a cross-section of the lithium composite oxide particle using a scanning electron microscope (SEM) after cross-sectioning the lithium composite oxide particle, a grain boundary density calculated by Equation 1 below for crystallites lying on an imaginary straight line crossing a center of the lithium composite oxide particle in the minor axis direction is 0.50 or less, Grain boundary density=(Number of grain boundaries between crystallites lying on the imaginary straight line/Number of crystallites lying on the imaginary straight line). [Equation 1]

7. The positive electrode active material of claim 1, wherein the positive electrode active material is an aggregate of a plurality of lithium composite oxide particles, and in a cross-sectional SEM image obtained by photographing a cross-section of the lithium composite oxide particle using a scanning electron microscope (SEM) after cross-sectioning the lithium composite oxide particle of the positive electrode active material, a proportion of the lithium composite oxide particle with a grain boundary density of 0.50 or less calculated by Equation 1 for crystallites lying on an imaginary straight line crossing the center of the lithium composite oxide particle in the minor axis direction is 30% or more, Grain boundary density=(Number of grain boundaries between crystallites lying on the imaginary straight line/Number of crystallites lying on the imaginary straight line). [Equation 1]

8. The positive electrode active material of claim 1, wherein the lithium composite oxide particle is a non-aggregated single particle consisting of a single crystallite.

9. The positive electrode active material of claim 1, further comprising a coating layer that covers at least a part of the surface of the lithium composite oxide particle, and wherein there is at least one type of metal oxide represented by Formula 2 below in the coating layer, $$Li_aM3_bO_c \quad \text{[Formula 2]}$$

Wherein,

M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, and $2 \le c \le 13$.

10. A positive electrode comprising the positive electrode active material of claim 1.

11. A lithium secondary battery using the positive electrode of claim 10.

* * * * *